May 27, 1952  A. L. JACKSON  2,598,550
MEAT TENDERIZING MACHINE WITH STRIPPER COMBS
Filed March 5, 1951  3 Sheets-Sheet 2

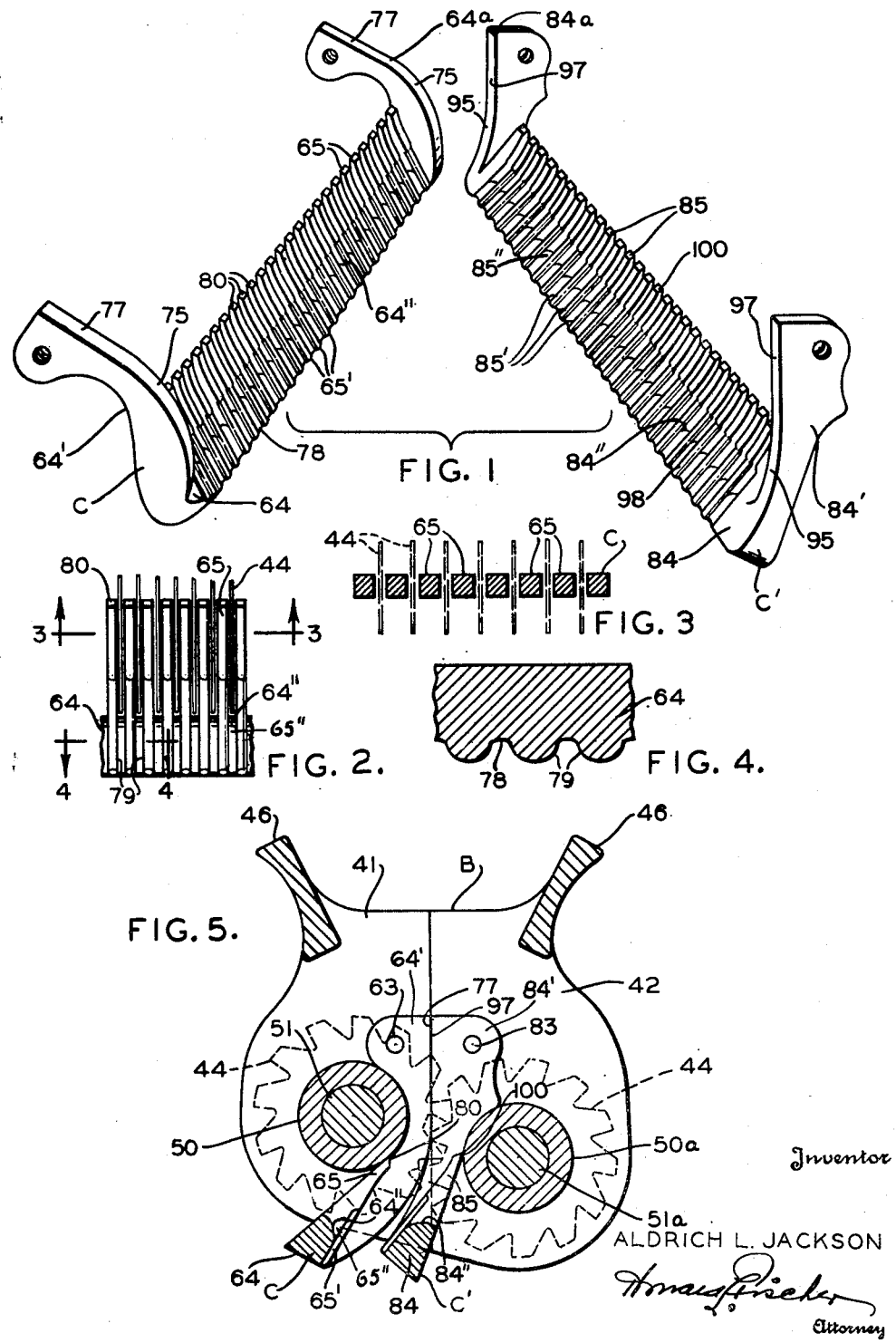

Inventor
ALDRICH L. JACKSON
By Howard Fischer
Attorney

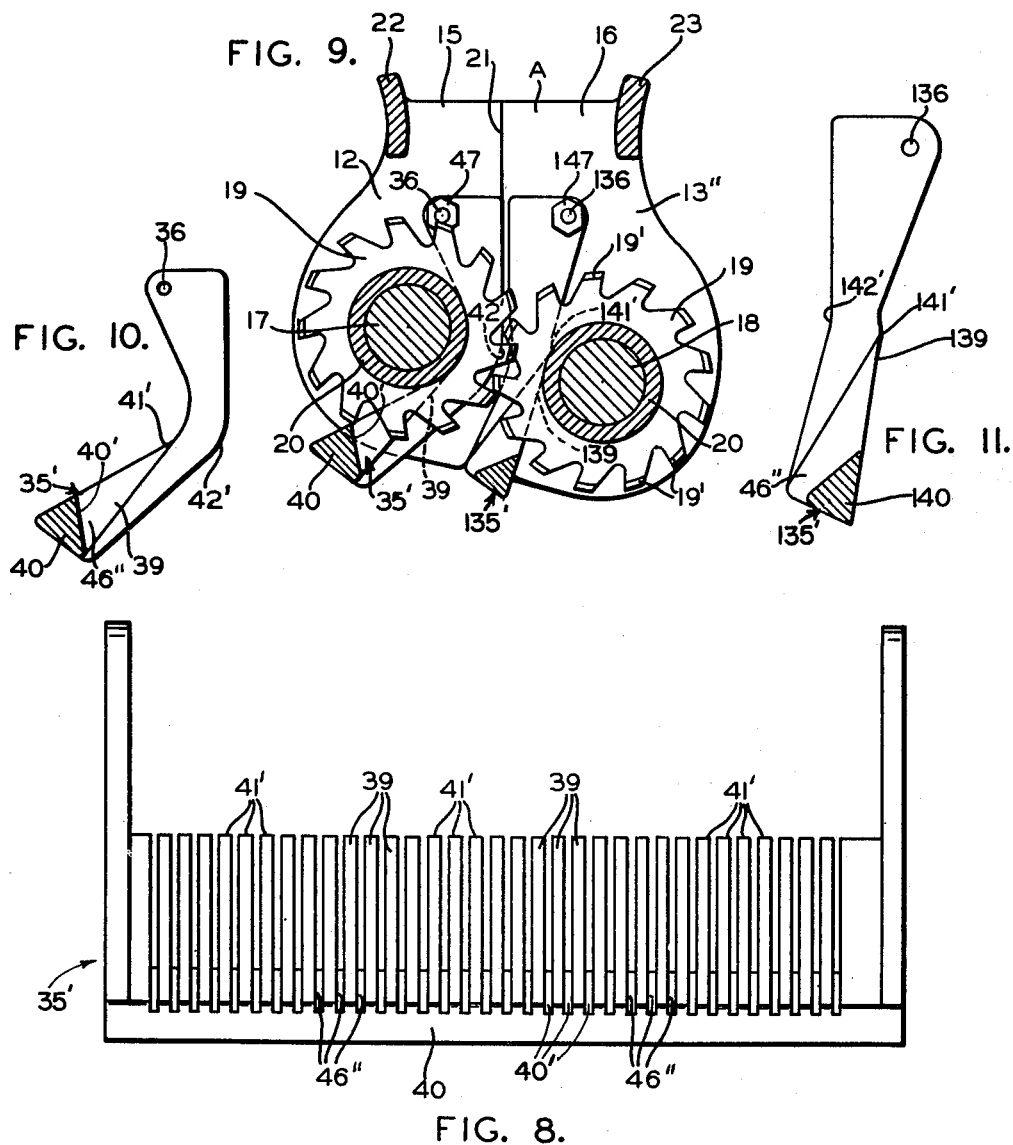

Patented May 27, 1952

2,598,550

UNITED STATES PATENT OFFICE 2,598,550

MEAT TENDERIZING MACHINE WITH STRIPPER COMBS

Aldrich L. Jackson, Eustis, Fla., assignor to Hobart-Federal Engineering Corporation, Minneapolis, Minn., a corporation of Minnesota Application March 5, 1951, Serial No. 213,889

7 Claims. (Cl. 17—26)

My invention relates to an improvement in stripper combs for a meat tenderizing unit through which meat is passed for tenderizing, the unit being supported within a casing.

The principal object of my invention is to provide a pair of stripper comb members for a meat tenderizing machine which may be pivotally mounted in spaced relation in the tenderizing unit and which are so proportioned that the pressure exerted on them by meat passing through the unit presses the comb teeth against the hubs between the tenderizing blades.

It is also an object of my invention to provide stripper combs which strip the hubs and cutting blades of the tenderizing unit of meat which tends to collect thereon and which also form guiding and directing means for the meat as it passes through and out of the unit.

In my improved tenderizing machine the tenderizing unit has two connected separable members each of which is provided with one of the rollers carrying the tenderizing blades, and with a pivotally mounted stripper comb member. Each stripper comb member has a pair of end plates by which it is pivoted above the roller, a transverse bar connecting the lower ends of the end plates located below the tenderizing blades, and stripper teeth extending upwardly from the transverse bar so as to bear against the hub between the tenderizing blades and remove meat particles such as sinews and strings from the hubs and blades. The comb teeth are of generally wedge-like shape so as to guide the sinews and strings of meat downwardly from between the blades and discharge them from the tenderizing unit along with the meat which is being tenderized, and the upper surface of the transverse bar between the stripper teeth angles downwardly and inwardly, and merges with the bases of the teeth in a smooth curve so as to reduce the likelihood of bits of meat lodging upon the upper surface of the bar. Thus, in effect, there is a smooth channel leading from the base of each tenderizing blade downwardly to the ends of the adjacent comb teeth where they merge with the transverse bar, and as a result the bits of meat stripped from the hub and tenderizing blades by the comb teeth are carried downwardly and out of the tenderizing unit with the pieces of meat as they leave the unit. The mounting and spacing of the two stripper comb members is such that the meat passing through the tenderizing unit presses the comb teeth into contact with the hubs, eliminating any need for springs to maintain such contact.

When the two hub units are separated, the stripper comb on each hub unit may be pivoted upwardly away from the blades and hubs for easy and thorough cleaning of the hub, blades and combs.

The invention will appear more clearly from the following detailed description when taken in connection with the accompanying drawings, showing by way of example preferred embodiments of the inventive idea.

In the drawings forming part of the application:

Figure 1 illustrates a perspective view of each of the stripper comb units as they appear removed from the tenderizing unit.

Figure 2 is an enlarged side view of a portion of a stripper comb unit showing the teeth and base bar in detail.

Figure 3 is an enlarged section on the line 17—17 of Figure 2.

Figure 4 is an enlarged section on the line 18—18 of Figure 2.

Figure 5 is an enlarged sectional view taken on line 5—5 of Figure 6 through the tenderizing unit, showing the cutter blades in dotted outline and illustrating the floating strippers in full lines with the bar which connects the end plates in section.

Figure 8 illustrates an enlarged side view of a further embodiment of the rear stripper member of the tenderizer unit.

Figure 9 is a transverse sectional view similar to Figure 5 through a tenderizing unit employing the stripper combs of Figure 8.

Figures 10 and 11 are, respectively, enlarged sectional views of the stripper comb members 35' and 37 shown in Figure 9.

Figure 6:
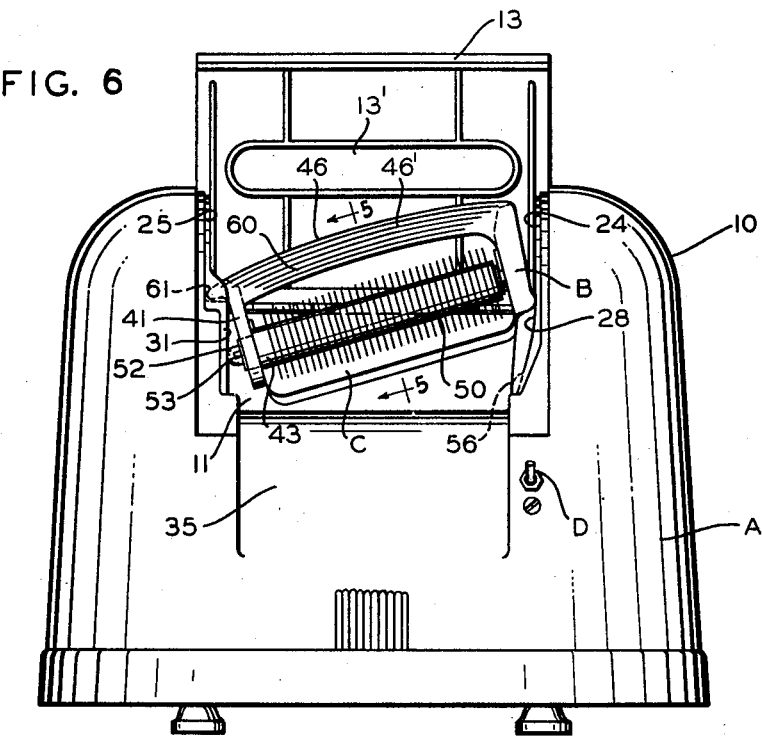
Figure 6 is a front view of a meat tenderizing machine showing the cover elevated and the tenderizing unit having the stripper combs in position to be inserted into operative position in the casing.
Figure 7:
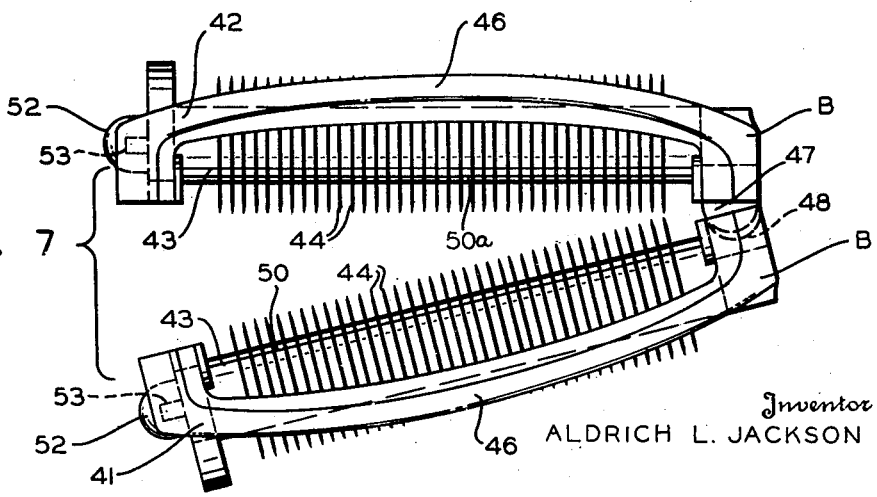
Figure 7 is a plan view of the tenderizing unit on which the stripper combs are mounted, with the two sections of the unit partly separated about their pivot.

The general construction of my meat tenderizing machine A includes an outer housing 10 which is adapted to receive a tenderizing unit B consisting of a pair of tenderizing sections 41 and 42 which, as seen in Fig. 7, are separably secured together at 47 and may be mounted in the housing 10. Each of the two tenderizing unit sections supports a roller comprising a spindle 51 on which is mounted a plurality of tenderizing blades 44 which are spaced apart by means of spacer hubs 50. As shown in Figure 5 the rollers are in substantially the same horizontal plane to permit vertical feeding of the meat therethrough. The construction of the tenderizing machine is described in detail and claimed in my copending application, Serial No. 37,776 filed July 9, 1948, and the casing together with the details of the supporting means therein are described in detail and claimed in my co-pending application, Serial No. 212,291 filed February 23, 1951. Accordingly they will not be described in detail here.

As seen in Fig. 5, the tenderizing unit section 41 is provided with a stripper comb member C and the section 42 is provided with a similar, but not identical stripper comb member C', said members being illustrated in perspective in Fig. 1. Preferably said members are die cast.

The stripper comb member C has a pair of end brackets or plates 64, 64a which are pivoted on the ends of the tenderizing section 41 at 63, above the spindle 51, and the end brackets extend below the spindle 51 and tenderizing blades 44 and are connected by a transverse base bar 64. A plurality of stripper comb teeth 65 extend upwardly from the base bar 64, there being a tooth 65 between each pair of blades 44 and said teeth having tapered ends 80 bearing against the spacer hubs 50.

As seen in Figs. 1 and 5, the stripper comb member C' for the tenderizer section 42 has end brackets 84', 84a similar to the brackets 64' of the member C and which are pivotally mounted at 83 on the ends of the tenderizer section 42 above the spindle 51a, and a transverse base bar 84 below the spindle 51a and having upwardly extending comb teeth 85 provided with wedge-shaped ends 100 which bear against the spacer hubs 50, 50a of the tenderizer section 42.

The end brackets 64' and 84' of the comb members C and C' are provided, respectively, with complementary flat surfaces 77 and 97 which are slightly spaced apart when the unit B is assembled, and the differing curvatures of convex portions 75 of the brackets 64' and concave portions 95 of the brackets 84' cause the teeth 65 and the teeth 85 to be spaced apart to form a sort of chute through which meat passes out of the tenderizing unit B. The pivotal mounting of the members C and C' permits them to "float," i. e., to rock slightly, and this combined with the spacing between the members causes meat passing through the unit B to press the teeth 65 and 85 against the spacer hubs 50, thus automatically scraping the meat particles, sinews and strings from the hubs 50 and the faces of the blades 44.

The structural details of the comb members C and C' are of value in their efficient functioning; and since these details are similar for both members only member C will be described in detail. The teeth 65 are wedge-shaped, and as seen in Fig. 3 their upper portions have a square cross section. The lower parts of the teeth 65 adjacent the face of the base bar 64 have rounded rib-like meat receiving faces 65' separated by intervening channels 65'' which are continuations in the upper portion of the bar 64 of the channels between the teeth 65. The upper portion of the bar 64, between the teeth 65, has a downwardly and forwardly curved surface 64'' which merges smoothly with the bases of the teeth and the rib-like portions 65' to form the bottoms of the channels 65'' and thus provides very free and unobstructed passages so that meat particles and strings which are picked up by the scraping portions of the teeth may be carried downwardly along the inside faces of the teeth 65 and the bar 64 and pass out of the tenderizing unit B along with the tenderized meat. As seen in Fig. 4, the lower part of the bar 64 has an undulating forward face in which the channels 65'' have become shallower, as shown at 78, and the face of the bar has continuations 79 of the rib-like portions 65' of the teeth. This construction greatly reduces the tendency for strippings of meat to be carried through with the rotation of the blades 44 and clog up between the blades and the bar 64 and on the under side of the stripper combs, and reduces the frequent removal of meat strippings which is necessary where the construction of the base bar is squared and not rounded and angularly disposed as at 64''.

The wedge-like teeth 65 and 85 provide graduated depth to the channels therebetween which also prevents pieces of meat and sinews from being drawn by the cutter discs 44 to the under side of the stripping surfaces of the stripper combs.

The teeth 85 of the stripper comb member C' have rib-like portions 85' separated by channels 85'', and the base bar 84 has a downwardly and forwardly curved surface 84'' which forms the bottoms of channels 85'' and merges smoothly with the rib-like portions 85' and the sides of the teeth 85.

Fig. 7 shows the tenderizing unit B with the sections 41 and 42 partially separated about their key 47. With the sections completely separated the stripper comb members C and C' may be pivoted inwardly and upwardly about the pivots 63 and 83, respectively, to completely free the comb teeth from their meshing positions between the cutters 44 for easy cleaning of the entire tenderizing mechanism.

In the modified form of the device shown in Figs. 8–11, two tenderizing sections 15 and 16 are provided with shafts 17 and 18 each of which carries a plurality of tenderizing blades 19 separated by spacer hubs 20. Stripper comb members 35' and 135' are pivotally mounted on the tenderizing sections 15 and 16 by means of nuts and bolts 47 and 147, respectively, affording pivots 36 and 136 on the comb members 35' and 135' respectively, and as seen in Fig. 9, said members are spaced slightly apart to give them limited freedom to rock, or "float," and a rounded portion 42' on each mounting arm of the stripper 35' bears on the surface 142' of the stripper 135'.

As best seen in Figs. 10 and 11, the stripper comb members 35' and 135' are similar, but not identical. Referring to the member 35' shown in Fig. 10, it has a base bar 40 and inclined comb teeth 39 provided with sharp ends 41' which bear against the spacer hubs 20. The base bar 40 has a straight upper face 40' which slants downwardly and forwardly so that, as seen in Fig. 9, the teeth of the tenderizing blades 19 pass in close proximity to the rear edge of the base bar 40 and meat strippings from the tenderizing teeth may pass down oblique channels 46'' formed by the sides of the comb teeth 39 and the diagonal surface 40' of the base bar. The stripper comb member 135', shown in Fig. 11, has a base bar 140, teeth 139 with sharp ends 141', and a downwardly and forwardly slanting straight upper face 140' between the lower portions of the teeth to provide oblique channels 146''. With the exception of the modification in the shape of the stripper comb teeth and base bar, the modified form of the invention is similar to the preferred form, and possesses the same general advantages in use. In each form the stripper members "float" so that meat passing through the unit rocks them to press the comb teeth against the hubs, thus cleaning the hubs and tenderizing blades, the members define the passage through which meat leaves the tenderizing unit, and the base bars have oblique channels of decreasing depth which form continuations of the channels between the comb teeth.

When meat is tenderized by passing it through the unit it will cause the strippers 35' and 135' to move in a manner to press the sharp edges 41' and 141' against the spacer hubs 20, thus automatically scraping the particles of meat or sinews from the hubs and between the respective blades 19. The strippers of Figures 8–11 have a certain amount of free pivoted movement so that meat passing between them may press the sharp edges of the teeth 39 against the surfaces of the hubs 20 to keep them clean and to clean the spaces between the cutter discs.

When the sections 15 and 16 are separated as disclosed in application Serial No. 757,965 now Patent No. 2,561,867, issued July 24, 1951, the sections 15 and 16 may be cleaned and the strippers 35' and 135' removed or pivoted outwardly from the blades 19 for cleaning both the strippers and the blades conveniently.

In both forms of the stripper combs, the sinews and stringy particles of meat which tend to collect in the channels between the teeth are carried out of said channels and likewise down over the oblique surfaces of the base bars due to the inclined formation of the same and by reason of the action of the blades 19 or 44 operating in these channels as well as the passing of the meat between the stripper units.

It will be apparent that my tenderizing unit operates in a self-cleaning manner, with the strippers C and C' or 35'' and 135'' at all times keeping the hubs of the shafts 17 and 18 or 51 clean of meat which otherwise might clog the same in operation of the tenderizing unit. In a meat tenderizing machine used to tenderize uncooked meat it is essential that the same be sanitary in every respect, and it is of primary importance that the blades and strippers of the tenderizing unit be freely accessible for separating and cleaning. I have accomplished this by providing pivotally mounted stripper combs mounted on separable sections forming the tenderizing unit.

It is an important feature of my invention to provide stripper units wherein the angle of the channels between the comb teeth at the base bar inclines in a manner to urge the meat passing between the teeth to the directed toward and onto the inner surface of the stripper comb and also downwardly and out from the unit B or A.

The invention is not to be understood as restricted to the details set forth since these may be modified within the scope of the appended claims without departing from the spirit and scope of the invention.

Having thus described the invention, what I claim as new and desire to secure by Letters Patent is:

1. In a meat tenderizer provided with a pair of spaced apart rollers including shafts having cutter disks thereon and hubs therebetween and means for supporting said rollers, a cleaning comb for each of said rollers comprising a pair of end plates, pivotal attachments on said supporting means for one end of said plates on one side of said rollers, a bar connecting the other ends of said plates on the other side of said rollers, fingers extending from said bar toward said rollers a sufficient distance to contact said hubs, said end plates being attached to said supporting means at points on a line substantially parallel to said rollers and being spaced from each other a distance substantially as great as the distance between said rollers.

2. The construction of claim 1 wherein the attaching means for the end plates is above said rollers and the bar is below the rollers.

3. The construction of claim 1 wherein the bar is provided with a rounded surface between each of said fingers forming channels angularly disposed to said fingers.

4. The construction of claim 1 including means for maintaining said strippers spaced from each other.

5. The construction of claim 1 wherein the supporting means is a two section, readily separable, frame, each section supporting a roller and a cleaning comb.

6. A stripper comb unit for meat tenderizing rollers having a series of cutter disks mounted upon a supporting shaft and spacer hubs between each of said disks comprising: a base; fingers extending from said base into the spaces between said series of cutter disks and of sufficient length to contact the spacer hubs, the base being provided with channels formed between said fingers and which extend through the base to cause meat particles to be carried away from said hubs and cutter disks and on to said base as meat is tenderized by said cutters whereby the particles of meat are carried away along with the meat being tenderized.

7. A stripper comb unit for meat tenderizing rollers having a series of cutter disks mounted upon a supporting shaft and spacer hubs between each of said disks comprising: a base; fingers extending from said base into the spaces between said series of cutter disks and of sufficient length to contact the spacer hubs, said fingers being provided with rounded edges projecting above the surface of the bar to relieve the friction between the meat and the lower surfaces of the strippers, the base being provided with channels formed between said fingers and which extend through the base to cause meat particles to be carried away from said hubs and cutter disks and on to said base as meat is tenderized by said cutters whereby the particles of meat are carried away along with the meat being tenderized.

ALDRICH L. JACKSON.

REFERENCES CITED

The following references are of record in the file of this patent:

UNITED STATES PATENTS

| Number | Name | Date |
|---|---|---|
| 653,222 | Don et al. | July 10, 1900 |
| 2,163,123 | Huse | June 20, 1939 |
| 2,176,751 | Spang | Oct. 17, 1939 |
| 2,310,067 | Doering et al. | Feb. 2, 1943 |
| 2,545,407 | Jackson | Mar. 13, 1951 |